United States Patent
Rachlin et al.

(10) Patent No.: US 10,466,927 B2
(45) Date of Patent: Nov. 5, 2019

(54) REPLICATION OF MEMORY IMAGE FOR EFFICIENT SIMULTANEOUS USES

(71) Applicant: Honeywell International Inc., Morris Plains, NJ (US)

(72) Inventors: Elliott Rachlin, Scottsdale, AZ (US); Ananthapadmanabha Krishnamurthy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 579 days.

(21) Appl. No.: 15/045,947

(22) Filed: Feb. 17, 2016

(65) Prior Publication Data

US 2017/0235520 A1 Aug. 17, 2017

(51) Int. Cl.
*G06F 13/36* (2006.01)
*G06F 3/06* (2006.01)
(Continued)

(52) U.S. Cl.
CPC .......... *G06F 3/0659* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS

2002/0133512 A1* 9/2002 Milillo ................ G06F 11/2082
2005/0044162 A1* 2/2005 Liang ................ G06F 17/30067
709/212

(Continued)

FOREIGN PATENT DOCUMENTS

| JP | 2004005139 A | 1/2004 |
| JP | 2010191650 A | 9/2010 |
| JP | 2011070253 A | 4/2011 |

OTHER PUBLICATIONS

Notification of Transmittal of the International Search Report and The Written Opinion of the International Searching Authority, or the Declaration dated Apr. 19, 2017 in connection with International Patent Application No. PCT/US2017/014398.

(Continued)

*Primary Examiner* — Henry Tsai
*Assistant Examiner* — Dean Phan
(74) *Attorney, Agent, or Firm* — Seager, Tufte & Wickhem LLP

(57) ABSTRACT

An apparatus includes a computing architecture having multiple memories including a first memory and a second memory. The multiple memories are configured to store multiple copies of a memory image including a first copy and a second copy, where the memory image contains instructions to be executed by the computing architecture and data to be used by the computing architecture. The computing architecture can be configured to perform multiple functions including a first function and a second function. The first memory can be positioned in the computing architecture so that the first copy of the memory image is located in a first position that is more efficient for the first function. The second memory can be positioned in the computing architecture so that the second copy of the memory image is located in a second position that is more efficient for the second function.

10 Claims, 3 Drawing Sheets

(51) Int. Cl.
*G06F 13/28* (2006.01)
*H04L 29/08* (2006.01)

(52) U.S. Cl.
CPC .............. *G06F 13/28* (2013.01); *H04L 67/10* (2013.01); *H04L 67/1095* (2013.01); *H04L 67/12* (2013.01)

(56) References Cited

U.S. PATENT DOCUMENTS

| | | | |
|---|---|---|---|
| 2010/0205149 A1* | 8/2010 | Sekiya | G06F 11/1435 707/640 |
| 2011/0078378 A1 | 3/2011 | Suzuki et al. | |
| 2012/0303915 A1 | 11/2012 | Hioki | |

OTHER PUBLICATIONS

Elliott Rachlin, "Apparatus and Method for Managing a Plurality of Threads in an Operating System", U.S. Appl. No. 14/622,465, filed Feb. 13, 2015, 31 pgs.

Elliott Rachlin, "System and Method for Endian Correction of Complex Data Structures in Heterogeneous Systems", U.S. Appl. No. 14/604,346, filed Jan. 23, 2015, 47 pgs.

Elliott Rachlin et al., "System and Method for Data Compatibility Across Heterogeneous Machine Architectures", U.S. Appl. No. 15/164,724, filed May 25, 2016, 27 pgs.

Elliott Rachlin et al., "Relay Mechanism to Facilitate Processor Communication With Inaccessible Input/Output (I/O) Device", U.S. Appl. No. 15/017,422, filed Feb. 5, 2016, 31 pgs.

Elliott Rachlin, "System and Method for Preserving Value and Extending Life of Legacy Software in Face of Processor Unavailability, Rising Processor Costs, or Other Issues", U.S. Appl. No. 15/017,467, filed Feb. 5, 2016, 34 pgs.

Elliott Rachlin, "System and Method for Capturing and Displaying Packets and Other Messages in Local Control Network (LCN)", U.S. Appl. No. 15/009,544, filed Jan. 28, 2016, 2016, 23 pgs.

* cited by examiner the following figures, descriptions,
REPLICATION OF MEMORY IMAGE FOR EFFICIENT SIMULTANEOUS USES

TECHNICAL FIELD

This disclosure is generally directed to computing devices. More specifically, this disclosure is directed to replication of a memory image for efficient simultaneous uses.

BACKGROUND

Industrial process control and automation systems are often used to automate large and complex industrial processes. These types of systems routinely include sensors, actuators, and controllers. The controllers typically receive measurements from the sensors and generate control signals for the actuators. Often times, a controller or other computing device uses a memory image that contains both the processing instructions to be executed by the computing device and data to be used by the computing device.

SUMMARY

This disclosure relates to replication of a memory image for efficient simultaneous uses.

In a first embodiment, an apparatus includes a computing architecture having multiple memories including a first memory and a second memory. The multiple memories are configured to store multiple copies of a memory image including a first copy and a second copy, where the memory image contains instructions to be executed by the computing architecture and data to be used by the computing architecture.

In a second embodiment, a method includes storing multiple copies of a memory image including a first copy and a second copy in multiple memories of a computing architecture. The multiple memories include a first memory and a second memory. The memory image contains instructions to be executed by the computing architecture and data to be used by the computing architecture. The method also includes using the multiple copies of the memory image to perform multiple functions of the computing architecture. The multiple functions include a first function that uses the first copy of the memory image and a second function that uses the second copy of the memory image.

In a third embodiment, an apparatus includes at least one processing device configured to execute instructions. The apparatus also includes an interface card configured to communicate over a network and to communicate with the at least one processing device. The apparatus further includes multiple memories including a first memory and a second memory. The multiple memories are configured to store multiple copies of a memory image, where the memory image contains instructions to be executed by the at least one processing device and data to be used by the at least one processing device. The first memory is located closer to or within the at least one processing device and is configured to store a first of the copies of the memory image, and the at least one processing device is configured to execute the instructions using the first copy of the memory image. The second memory is located within the interface card and is configured to store a second of the copies of the memory image, and the interface card is configured to transfer data to and from the network using the second copy of the memory image.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
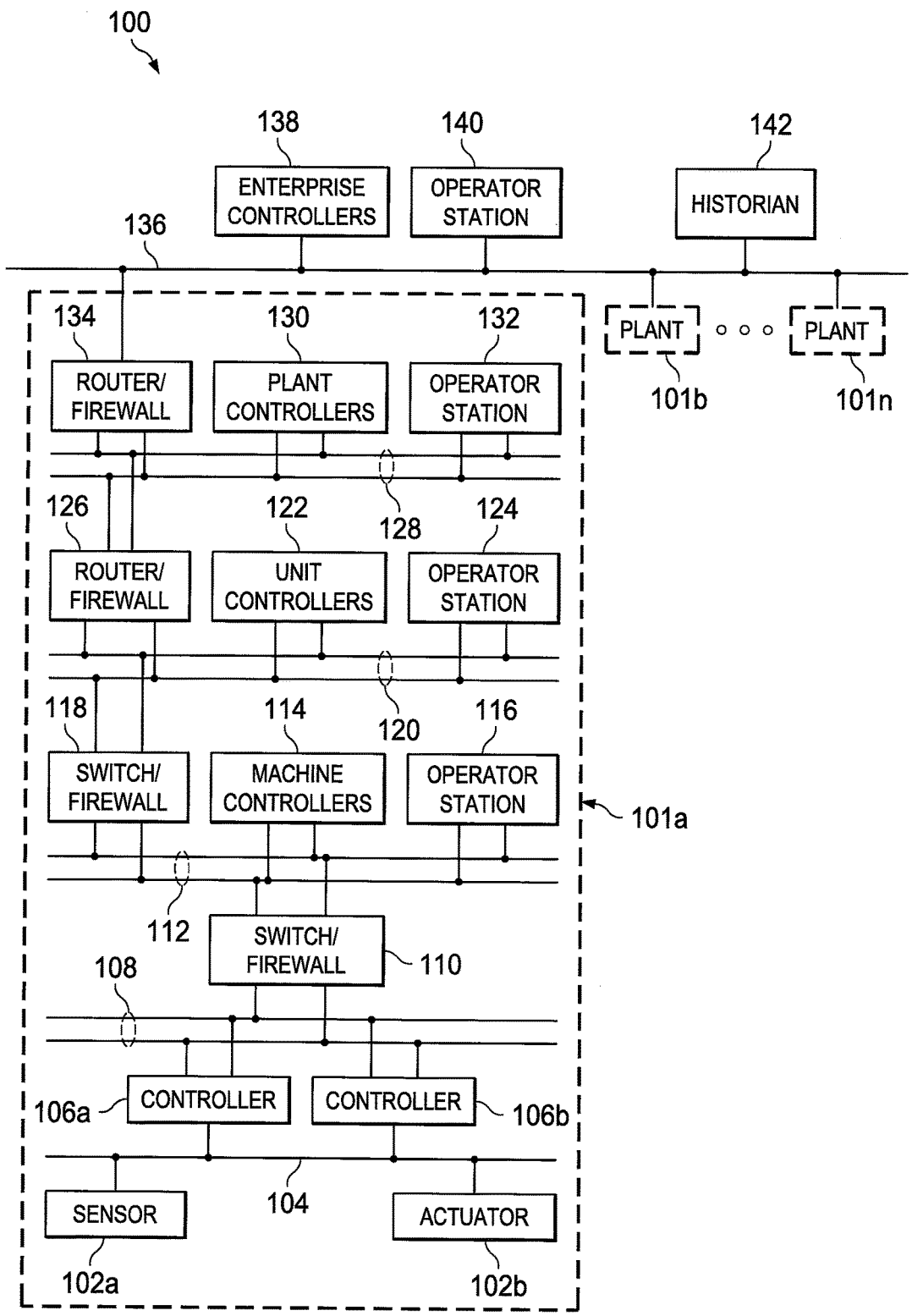
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106a-106b, which are coupled to the network 104. Among other things, each of the controllers 106a-106b may use the measurements from one or more sensors 102a to control the operation of one or more actuators 102b. For example, each controller 106a-106b could receive measurement data from one or more sensors 102a and use the measurement data to generate control signals for one or more actuators 102b. Multiple controllers 106a-106b could also operate in a redundant configuration, such as when one controller 106a operates as a primary controller while another controller 106b operates as a backup controller (which synchronizes with the primary controller and can take over for the primary controller in the event of a fault with the primary controller). Each controller 106a-106b includes any suitable structure for interacting with one or more sensors 102a and controlling one or more actuators 102b. Each controller 106a-106b could, for example, represent a multivariable controller, such as a Robust Multivariable Predictive Control Technology (RMPCT) controller or other type of controller implementing model predictive control (MPC) or other advanced predictive control (APC). As a particular example, each controller 106a-106b could represent a computing device running a real-time operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106a-106b, sensors 102a, and actuators 102b, which could be associated with a particular piece of industrial equipment (such as a boiler or other machine). For example, the machine-level controllers 114 could log information collected or generated by the controllers 106a-106b, such as measurement data from the sensors 102a or control signals for the actuators 102b. The machine-level controllers 114 could also execute applications that control the operation of the controllers 106a-106b, thereby controlling the operation of the actuators 102b. In addition, the machine-level controllers 114 could provide secure access to the controllers 106a-106b. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106a-106b, sensors 102a, and actuators 102b).

One or more operator stations 116 are coupled to the networks 112. The operator stations 116 represent computing or communication devices providing user access to the machine-level controllers 114, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the machine-level controllers 114. The operator stations 116 could also allow the users to adjust the operation of the sensors 102a, actuators 102b, controllers 106a-106b, or machine-level controllers 114. In addition, the operator stations 116 could receive and display warnings, alerts, or other messages or displays generated by the controllers 106a-106b or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one switch/firewall 118 couples the networks 112 to two networks 120. The switch/firewall 118 includes any suitable structure for providing communication between networks, such as a secure switch or combination switch/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106a-106b, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (IVIES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 142 can be coupled to the network 136. The historian 142 could represent a component that stores various information about the system 100. The historian 142 could, for instance, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). The instructions and data used by a controller or other device could take the form of a memory image that contains both the instructions and the data. Each of the controllers and operator stations could also include at least one network interface, such as one or more Ethernet interfaces or wireless transceivers.

As noted above, a controller or other computing device may use a memory image that contains both the processing instructions to be executed by the computing device and data to be used by the computing device. Often times, designers or other personnel are faced with the problem of deciding where to locate a memory image within a computing architecture. Depending on where the memory image is located, some operations involving the memory image will be more efficient, while other operations involving the memory image will be less efficient. In many cases, there is no single place in an architecture where a memory image can be placed that is efficient for most or all operations. In conventional architectures, the designers or other personnel typically select the location for a memory image by making a tradeoff between different levels of efficiency that can be achieved for the various operations to be performed. Any choice made in this manner, however, is a compromise for which some operations are inefficient, which is clearly an undesirable situation.

In accordance with this disclosure, a controller or other computing device contains or has access to multiple copies of the same memory image, and the different copies of the memory image are located at different locations within the computing architecture. This allows higher efficiencies of operation to be achieved by locating different copies of the memory image in different locations for different operations. Whenever an operation is to be performed, it can be performed on the particular memory image copy that is most efficient for that operation.

As an example, consider a region of a memory image that is used for both machine instruction execution and buffering of input/output (I/O) data. One copy of the memory image could be stored closer to the instruction execution function so that instructions can be fetched more rapidly, which results in faster execution times. At the same time, another copy of the memory image could be stored at the edge of the architecture near one or more I/O devices. This results in potentially higher data transmission speeds compared to using the memory image closer to the instruction execution function.

Additional details regarding the use of multiple copies of a memory image are provided below. Also described below are various techniques that can be used to help ensure that multiple copies of a memory image are appropriately used by different components.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which replication of a memory image can be supported. This functionality can be used in any other suitable system, and the system need not be related to industrial process control and automation.

Figure 2:
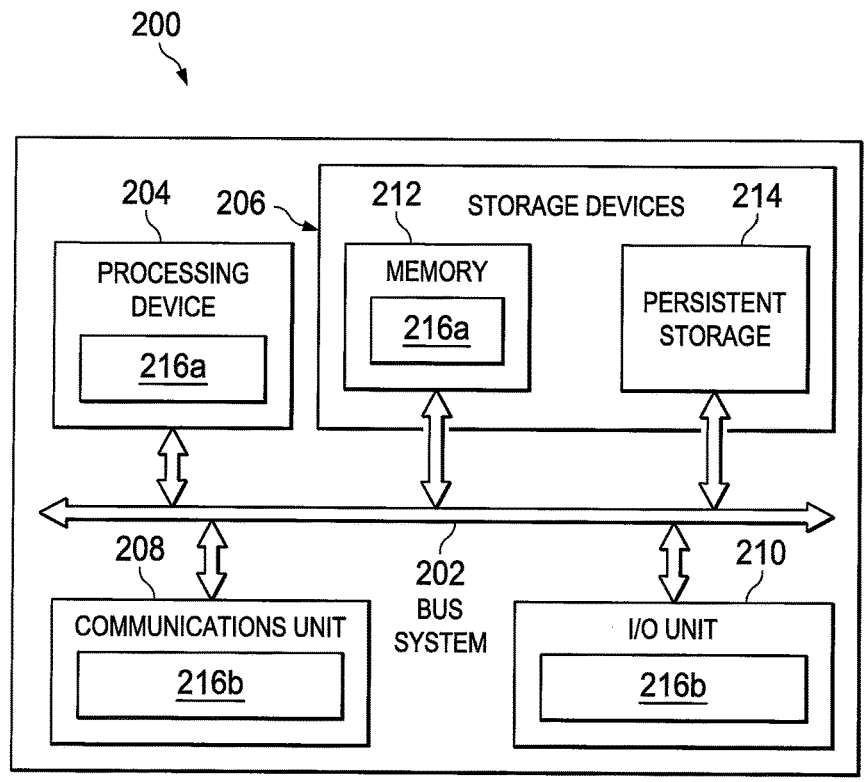
FIG. 2 illustrates an example computing device supporting replication of a memory image for efficient simultaneous uses according to this disclosure.

FIG. 2 illustrates an example computing device 200 supporting replication of a memory image for efficient simultaneous uses according to this disclosure. The computing device 200 shown in FIG. 2 could, for example, denote any of the controllers, operator stations, or other computing devices shown in FIG. 1 and described above. However, the computing device 200 could be used to support any other suitable functionality and may or may not be used in conjunction with an industrial process control and automation system.

As shown in FIG. 2, the computing device 200 includes a bus system 202, which supports communication between at least one processing device 204, at least one storage device 206, at least one communications unit 208, and at least one I/O unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card or a wireless transceiver facilitating communications over a network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device. In addition, the I/O unit 210 can support communications and interactions with various other I/O devices.

Multiple copies 216a-216b of at least one memory image can be used in the computing device 200. For example, one copy 216a of the memory image could be stored in internal memory of the processing device 204 or in one or more of the storage devices 206 (such as the memory 212). Another copy 216b of the memory image could be stored in the communications unit 208 or the I/O unit 210. The copy 216a could be provided closer (logically) to the processing device 204 in order to support faster execution of instructions contained in the memory image. The copy 216b could be provided closer (logically) to a component of the computing device 200 that engages in input or output with external devices or systems in order to support faster data transfers. Note, however, that any number of copies of a memory image can be used to support any suitable functionality in the computing device.

Although FIG. 2 illustrates one example of a computing device 200 supporting replication of a memory image for efficient simultaneous uses, various changes may be made to FIG. 2. For example, computing devices can come in a wide variety of configurations. The computing device shown in FIG. 2 is meant to illustrate one example implementation and does not limit this disclosure to a particular type of computing device.

Figure 3:
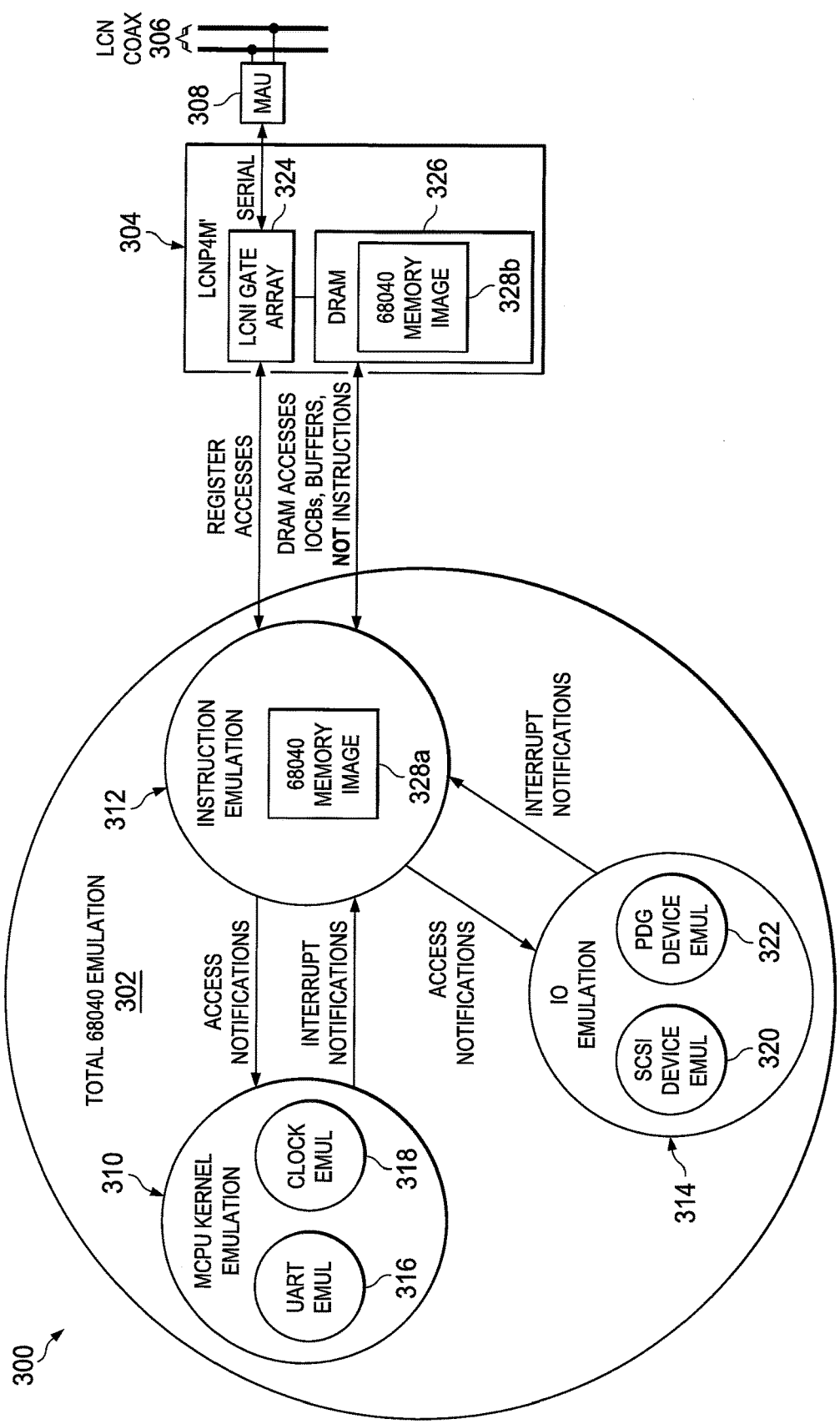
FIG. 3 illustrates a specific example of a computing device supporting replication of a memory image for efficient simultaneous uses according to this disclosure.

FIG. 3 illustrates a specific example of a computing device 300 supporting replication of a memory image for efficient simultaneous uses according to this disclosure. As shown in FIG. 3, this specific example of the computing device 300 includes an emulation architecture 302 running on computer hardware (such as the processing device 204). The computing device 300 also includes an interface card 304, which facilitates access to and communication over a Local Control Network (LCN) 306 via a media access unit (MAU) 308.

The emulation architecture 302 includes an emulation framework that is used to emulate a specific type of processor (a MOTOROLA 68040 processor in this example) on another type of processor (such as an INTEL x86 processor). The framework includes a kernel emulator 310, an instruction emulator 312, and an I/O emulator 314. As the names imply, the kernel emulator 310 is used to emulate so-called kernel functions (compute functions not typically performed by a main processor, examples of which are named below). Also, the instruction emulator 312 is used to emulate the execution of instructions on a processor, and the I/O emulator 314 is used to emulate input and output operations on a processor.

The kernel emulator 310 could include various types of emulations depending on the specific kernel being emulated. For example, the kernel emulator 310 could include a universal asynchronous receiver/transmitter (UART) emulator 316 and a clock emulator 318 for the 68040 processor. The UART emulator 316 is used to emulate a UART interface of the 68040 processor, while the clock emulator 318 is used to emulate a clock source of the 68040 processor.

The instruction emulator 312 is used to implement various instructions that are not executed within the kernel emulator 310. For instance, the instruction emulator 312 can be used to execute various instructions in legacy source code in order to emulate the execution of the legacy source code on the 68040 processor. In some embodiments, the instruction emulator 312 could denote an instruction emulator from MICROAPL LTD.

The I/O emulator 320 is used to emulate one or multiple I/O interfaces. The I/O emulator 320 in this example includes a small computer system interface (SCSI) device emulator 320 and a HONEYWELL PDG video device emulator 322. These emulators 320 and 322 are used to emulate different types of input and output interfaces often used with the 68040 processor. Note, however, that other or additional I/O emulators could also be implemented as part of the I/O emulator 320.

The emulators 310-314 communicate and exchange access notifications and interrupt notifications. An access notification is used to indicate that one emulator needs to access data or other information associated with another emulator. An interrupt notification is used by one emulator to inform another emulator that an interrupt has occurred so that the other emulator can take suitable action in response to the interrupt.

The interface card 304 in this example includes a gate array 324 and a memory 326. The gate array 324 functions to provide physical connection to an external network, in this case an LCN. The memory 326 is used to store data flowing through the interface card 304. The gate array 324 includes any suitable circuitry providing connection to an external network. The memory 326 includes any suitable structure for storing and facilitating retrieval of information, such as a dynamic random access memory (DRAM).

In this example, multiple copies 328a-328b of a memory image are provided at different locations of the architecture. In particular, one copy 328a of the memory image is provided as part of the instruction emulator 312. Since the emulator 312 is responsible for emulating the execution of instructions on a processor, the presence of the memory image copy 328a within the instruction emulator 312 helps to speed up execution of the instructions. Another copy 328b of the memory image is provided as part of the interface card 304, such as within the memory 326 of the interface card 304. Since the interface card 304 is used to facilitate the transfer of I/O data to and from the LCN 306 via the memory image, the presence of the memory image copy 328b within the interface card 304 helps to speed up data transfers through the interface card 304.

Since there are multiple copies of the same memory image in FIGS. 2 and 3, a mechanism can be used to help ensure that each component accessing a copy of the memory image is obtaining valid data from that copy. Various techniques can be used to help ensure that multiple copies 216a-216b, 328a-328b of a memory image are used appropriately by different components. The following describes example techniques, although other techniques could also be used.

One technique involves directing read operations involving a memory image to the closest copy of the memory image and directing write operations to all copies of the memory image. In this approach, when data is read from a memory image, a read request can be provided to the copy of the memory image that is closest to the component requesting the data. Thus, in FIG. 2, read requests from the processing device 204 can be directed to the copy 216a of the memory image, while read requests from the communications unit 208 or the I/O unit 210 can be directed to the copy 216b of the memory image. Write requests from the processing device 204, the communications unit 208, or the I/O unit 210 can be directed to both copies 216a-216b of the memory image. In FIG. 3, read requests from the instruction emulator 312 can be directed to the copy 328a of the memory image, while read requests from the interface card 304 can be directed to the copy 328b of the memory image. Write requests from the instruction emulator 312 or the interface card 304 can be directed to both copies 328a-328b of the memory image.

Another technique involves dividing the overall memory space of a memory image into chunks. Accesses to the memory image (both read operations and write operations) can then be directed to one and only one copy of the memory image based on the chunk that is being accessed. This approach operates under the assumption that any given region of the memory image will be accessed using a single one of the memory image copies. Continuously or at various points in time, the contents of the memory image chunks in the different memory image copies can be substantially synchronized so that, for example, data can be transferred between different components that are operating using the different memory image copies.

A particular example of the second approach could occur as follows. The kernel emulator 310 could be allowed to access memory locations $E000-$FFFF of a memory image copy 328a, and the kernel emulator 310 could shadow any kernel registers associated with operation of the kernel. The I/O emulator 314 could be allowed to access memory locations $40000-$4FFFF of the memory image copy 328a, and the I/O emulator 314 could shadow any I/O registers associated with input or output operations. In addition, the interface card 304 could be allowed to access memory locations $80000 and above of the memory image copy 328b. In this way, different components are able to access and use different portions of the memory image.

One specific way to implement the second approach is to intercept all memory image read and write requests and to classify the associated memory addresses being accessed into categories, such as "executable code," "stack memory," "heap memory," and "I/O address space." For each request, based on the category of that request, one of the memory image copies can be selected and accessed, which helps to ensure that accesses to a common region of the memory image occur using the same copy of the memory image. The accesses to the memory image copies can be direct or through an offset that uniquely targets the various memory image locations within the overall architecture. Virtual memory offsets are one way to accomplish this in systems that support virtual addressing. In systems without virtual addressing, index registers can provide the needed offsets to target individual areas in a memory image.

Note that in either approach, various information can be exchanged between the instruction emulator 312 and the interface card 304, such a register accesses, DRAM accesses, input-output control blocks (IOCB), and buffers. This is because data being transferred over the LCN 308 flows through the interface card 304 to and from the emulation architecture 302, so data transfers are needed between the emulation architecture 302 and the interface card 304. However, there is no need to exchange instructions between the instruction emulator 312 and the interface card 304 since each component 312, 304 has local access to the instructions.

Although FIG. 3 illustrates one specific example of a computing device 300 supporting replication of a memory image for efficient simultaneous uses, various changes may be made to FIG. 3. For example, various components in FIG. 3 could be combined, further subdivided, or omitted and additional components could be added according to particular needs. Also, while FIG. 3 illustrates one specific emulation involving a 68040 processor, any other suitable emulations involving different processors could also be supported. In addition, copies of memory images could be used in computing devices without emulation.

Figure 4:
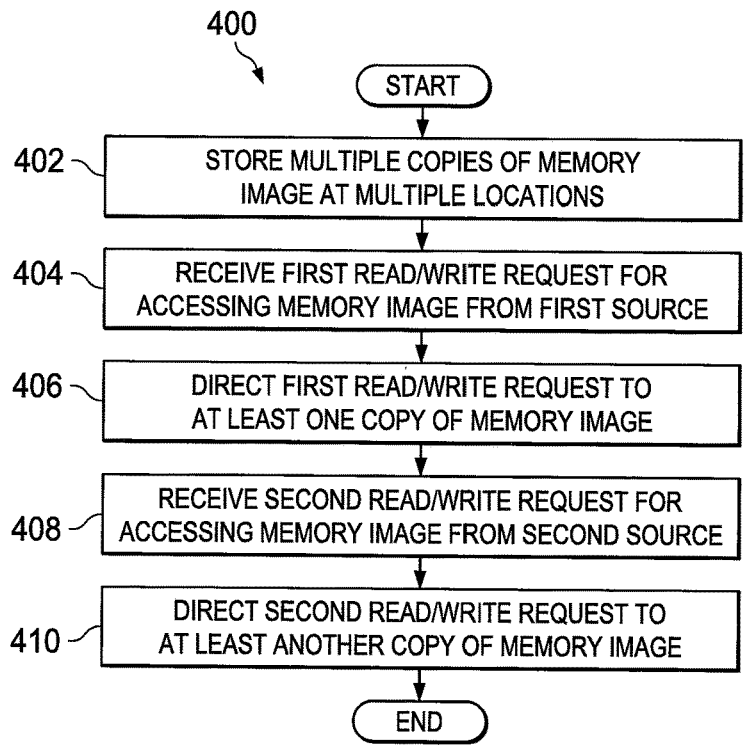
FIG. 4 illustrates an example method for replication of a memory image for efficient simultaneous uses according to this disclosure.

FIG. 4 illustrates an example method 400 for replication of a memory image for efficient simultaneous uses according to this disclosure. For ease of explanation, the method 400 is described with respect to the computing devices 200 and 300 of FIGS. 2 and 3, although the method 400 could be used with any other suitable devices and in any suitable systems.

As shown in FIG. 4, multiple copies of a memory image are stored at multiple locations in a computing architecture at step 402. This could include, for example, storing multiple copies 216a-216b, 328a-328b of a memory image at different locations where different functions in the computing architecture are to be performed. The different functions could include processing or analysis functions, input/output functions, or other functions.

A first read/write request for accessing the memory image is received from a first source at step 404, and the first read/write request is directed to at least one of the memory image copies at step 406. This could include, for example, the processing device 204 or the instruction emulator 312 issuing a request to read data from or write data to one or more memory locations of the memory image. This could also include the system directing the read request to the nearest copy 216a, 328a of the memory image or directing the write request to all copies 216a-216b, 328a-328b of the memory image. This could further include the system identifying the memory image chuck associated with the first read/write request and directing the first read/write request to the copy of the memory image in which that chunk can be accessed.

A second read/write request for accessing the memory image is received from a second source at step 408, and the second read/write request is directed to at least another of the memory image copies at step 410. This could include, for example, the communications unit 208, the I/O unit 210, or the interface card 304 issuing a request to read data from or write data to one or more memory locations of the memory image. This could also include the system directing the read request to the nearest copy 216b, 328b of the memory image or directing the write request to all copies 216a-216b, 328a-328b of the memory image. This could further include the system identifying the memory image chuck associated with the second read/write request and directing the second read/write request to the copy of the memory image in which that chunk can be accessed.

In this way, different copies of a memory image can be stored at multiple locations based on, for example, the functions to be performed using the memory image. Higher efficiencies of operation can therefore be achieved using the multiple copies of the memory image by allowing operations to be performed on the particular memory image copies that are most efficient for those operations.

Although FIG. 4 illustrates one example of a method 400 for replication of a memory image for efficient simultaneous uses, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs. In addition, any number of memory image copies and request sources could be used in the method 400.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device,", "unit," "component," "element," "member," "architecture," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
a computing architecture comprising multiple memories including a first memory and a second memory, the computing architecture is configured to perform two or more functions including an instruction execution function and an input/output function;
at least one processing device configured to execute an instruction emulator that is configured to perform the instruction execution function, the first memory situated in the instruction emulator or at least closer to the instruction emulator than the second memory or within the instruction emulator;
an interface card configured to communicate over a network and configured to execute the input/output function, the second memory situated in the interface card or at least closer to the interface card than the first memory; and
wherein the first memory and the second memory each are configured to store a copy of a memory image, wherein the memory image contains instructions to be executed by the computing architecture and data to be used by the computing architecture.

2. The apparatus of claim 1, wherein:
the instruction emulator is configured to execute read and write memory access requests when performing the instruction execution function, wherein the read memory access requests of the instruction execution function are directed to the first memory and the write memory access requests of the instruction execution function are directed to the first memory and the second memory; and
the interface card is configured to execute read and write memory access requests when performing the input/output function, wherein the read memory access requests of the input/output function are directed to the second memory and the write memory access requests of the input/output function are directed to the first memory and the second memory.

3. The apparatus of claim 2, wherein the computing architecture is configured, for each memory access request, to:
identify a portion of the memory image related to the memory access request; and
direct the memory access request to the first memory or the second memory based on the identified portion of the memory image.

4. The apparatus of claim 2, wherein the computing architecture is configured, for each memory access request, to:
classify the memory access request into one of multiple categories;
select one of the first memory or the second memory based on the classification;
direct the memory access request to the selected first memory or second memory; and
access a portion of the selected first memory or second memory directly or using an offset.

5. A method comprising:
storing multiple copies of a memory image including a first copy in a first memory and a second copy in a second memory of a computing architecture, wherein the computing architecture is configured to perform two or more functions including a first function and a second function, the memory image containing instructions to be executed by the computing architecture and data to be used by the computing architecture;
executing the first function using a first processing device of the computing architecture, wherein the first processing device uses the first copy of the memory image in the first memory when executing the first function, wherein the first memory is situated closer to the first processing device than the second memory;
executing the second function using a second processing device of the computing architecture, wherein the second processing device uses the second copy of the memory image in the second memory when executing the second function, wherein the second memory is situated closer to the second processing device than the first memory;
wherein the first function comprises an instruction emulator function; and
wherein the second function comprises an input/output function of an interface card.

6. The method of claim 5, wherein
the first function is configured to execute read and write memory access request, wherein the read memory access requests related to the first function are directed to the first memory and the write memory access requests related to the first function are directed to the first memory and the second memory; and
the second function is configured to execute read and write memory access request, wherein the read memory access requests related to the second function are directed to the second memory and the write memory access requests related to the second function are directed to the first memory and the second memory.

7. The method of claim 6, wherein directing the read and write memory access requests comprises, for each memory access request:
identifying a portion of the memory image related to the memory access request; and
directing the memory access request to the first memory or the second memory based on the identified portion of the memory image.

8. The method of claim 6, wherein directing the read and write memory access requests comprises, for each memory access request:
classifying the memory access request into one of multiple categories;
selecting the first memory or the second memory based on the classification;
directing the memory access request to the selected first memory or second memory; and
accessing a portion of the selected first memory or second memory directly or using an offset.

9. An apparatus comprising:
multiple memories including a first memory and a second memory, the multiple memories are configured to store multiple copies of a memory image with the first memory configured to store a first copy of the memory image and the second memory configured to store a second copy of the memory image;
an instruction emulator that is configured to perform an instruction execution function using the first copy of the memory image in the first memory, wherein the first memory is located logically closer to the instruction emulator relative to the second memory to increase the speed of the instruction emulator function;
an interface card configured to communicate over a network and perform an input/output function using the second copy of the memory image in the second memory, wherein the second memory is located logically closer to the interface card relative to the first memory to increase the speed of the input/output function; and wherein the interface card is configured to transfer data to and from the network using the second copy of the memory image.

10. The apparatus of claim 9, wherein at least one first processing device is configured to execute the instruction execution function, and at least one second processing device is configured to execute the input/output function.

\* \* \* \* \*